US005480605A

United States Patent [19]

Skaalen, Jr. et al.

[11] Patent Number: 5,480,605
[45] Date of Patent: Jan. 2, 1996

[54] METHOD AND APPARATUS FOR MANUFACTURING COIN POUCH

[75] Inventors: Peter L. Skaalen, Jr., Hartford; Thomas W. Papez; Roy A. Scheunemann, both of West Bend, all of Wis.

[73] Assignee: Amity Leather Products Company, West Bend, Wis.

[21] Appl. No.: 228,698

[22] Filed: Apr. 18, 1994

[51] Int. Cl.[6] .............................. B68F 1/00; B29C 69/00; C14B 1/00

[52] U.S. Cl. .......................... 264/234; 264/320; 425/394; 425/398; 493/160; 493/167; 69/2; 69/8; 69/32; 69/21

[58] Field of Search .................................. 69/1, 2, 7, 7.3, 69/8, 29, 32, 33, 48, 21; 425/394, 398; 493/152, 160, 167, 168, 170, 174; 264/234, 320

[56] References Cited

U.S. PATENT DOCUMENTS

| | | |
|---|---|---|
| D. 256,219 | 8/1980 | Miyazaki . |
| 399,376 | 3/1889 | Capehart . |
| 443,880 | 12/1890 | Topham . |
| 579,653 | 3/1897 | Pitz . |
| 739,021 | 9/1903 | O'Shea . |
| 739,022 | 9/1903 | O'Shea . |
| 744,391 | 11/1903 | O'Shea . |
| 744,392 | 11/1903 | O'Shea . |
| 751,748 | 2/1904 | O'Shea . |
| 924,681 | 6/1909 | Ludescher . |
| 1,033,578 | 7/1912 | Greenberg . |
| 1,371,104 | 3/1921 | McFarland . |
| 1,824,354 | 9/1931 | Kotlicke . |
| 2,004,164 | 6/1935 | Hofmann .................................... 69/8 |
| 2,125,354 | 8/1938 | Meier . |
| 2,287,409 | 6/1942 | Biawitz . |
| 2,377,166 | 5/1945 | Mayer . |
| 2,394,219 | 2/1946 | Vachon . |
| 2,704,238 | 3/1955 | Ushakoff .................................. 69/21 |

FOREIGN PATENT DOCUMENTS

| | | |
|---|---|---|
| 1232990 | 9/1989 | Japan ........................................ 69/8 |
| 5031267 | 2/1993 | Japan ........................................ 69/21 |

*Primary Examiner*—C. D. Crowder
*Assistant Examiner*—Michael A. Neas
*Attorney, Agent, or Firm*—Fitch, Even, Tabin & Flannery

[57] ABSTRACT

An apparatus and method for manufacturing leather coin pouches. The method provides for wetting a leather assembly comprising a substantially flat, flexible leather cover laminated to a substantially flat, more rigid centerpiece, to soften the leather which facilitates the eventual forming of the leather. The method further comprises creasing the leather in a creasing die. After a preforming step designed to foldedly bias the leather assembly toward forming as desired, the leather assembly is formed into a foldedly raised leather assembly with an overlapping flap spiral closure. Finally, while its formed shape is retained, the leather assembly is dried.

The apparatus comprises a wetter for wetting the leather assembly, a creasing die for creasing the leather assembly into a creased leather assembly, a frusto-conical male/female preforming die for preforming the creased leather assembly, a forming die for forming the creased leather assembly into a foldedly raised formed leather assembly with a spiral closure, and an oven for drying the formed leather assembly.

10 Claims, 7 Drawing Sheets

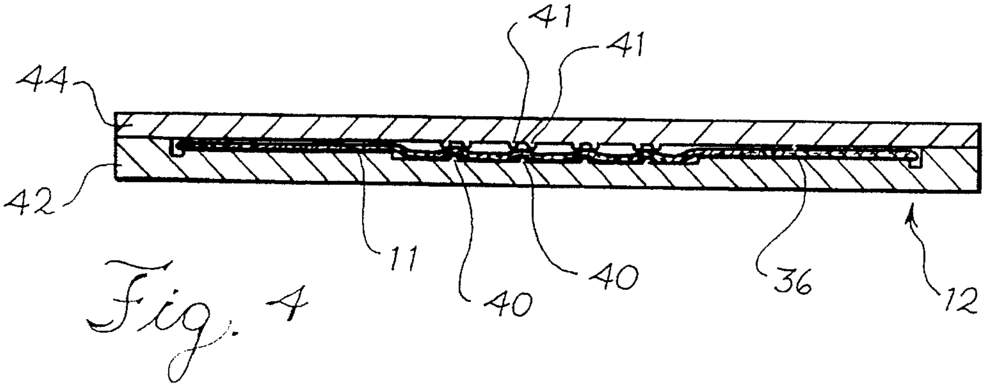
Fig. 4
Fig. 9
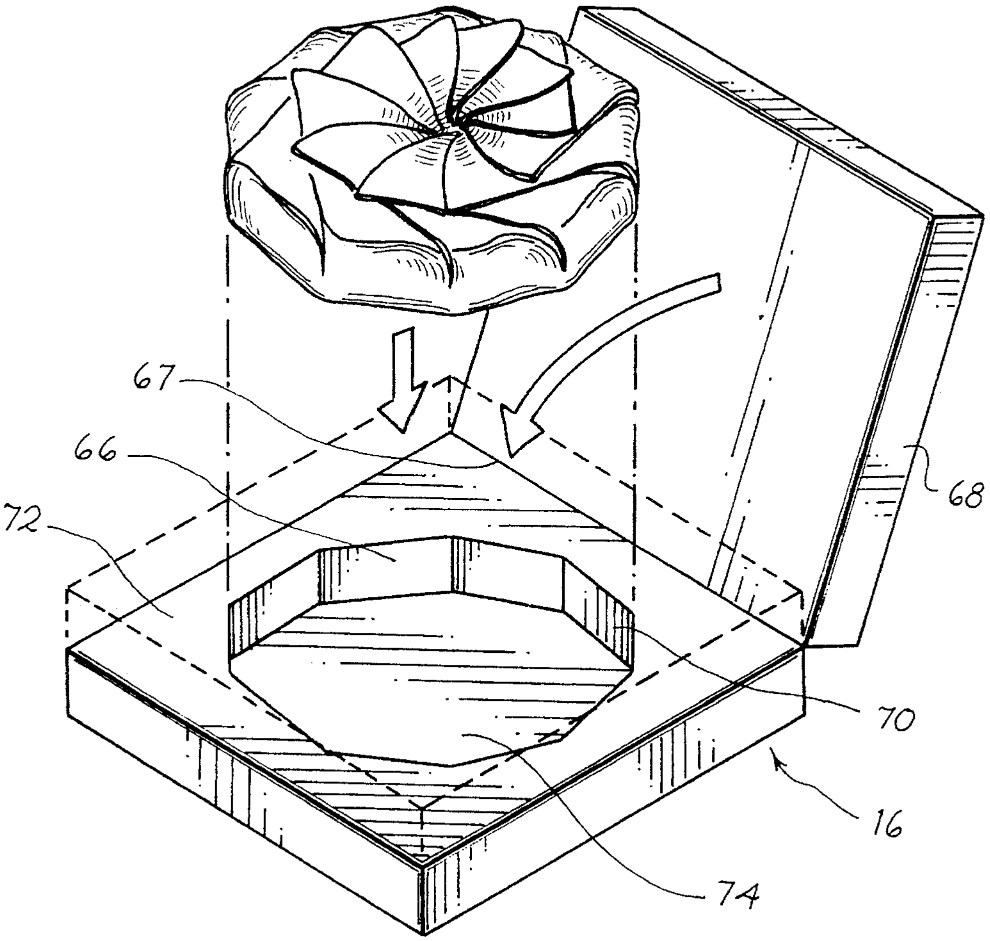

METHOD AND APPARATUS FOR MANUFACTURING COIN POUCH

BACKGROUND OF THE INVENTION

The invention relates generally to manufacture of leather goods, and more specifically to a method for manufacturing leather coin pouches.

Leather pouches capable of holding coins, keys, and the like have long been popular consumer products. A popular type of such pouches is a spirally folded flower-shaped piece of leather laminated to a centerplate. When no external forces are applied to the pouch, the several flaps lie one over the next in a spiral pattern, limiting the size of the aperture at the center sufficiently to inhibit the escape of coins or keys. When manual force is applied to the centerplate by squeezing opposite ends between a thumb and a finger, the force causes the plate to bow toward the leather backing, straightening the leather near the perimeter of the centerplate. This causes the spirally overlapping flaps to open, enlarging the aperture as more force is applied until the maximum aperture is attained. Removal of the items from the pouch is then accomplished by placing one's fingers through the aperture to pull them out or by inverting the pouch to let them fall out. The leather is sufficiently resilient that, upon release of the manual pressure, the pouch returns to its initial closed position.

While leather pouches of the type described above have been manufactured for many years, it is believed that such pouches have been manufactured by highly labor-intensive methods involving numerous manual folding and creasing operations that require a great deal of precision and manual dexterity. Applicants do not have first-hand experience with methods of manufacture employed prior to the invention. However, applicants' understanding of a typical prior art manufacturing process is as follows.

Manufacture of the pouch begins with die-cutting a flat blank. The blank is moistened with water, and a creasing die is then pressed against one surface of the blank, forming linear grooves or indentations on one surface of the blank at locations where the blank is to be folded. The blank is then folded and creased by hand. Each fold is separately made, and must be held in place with manual pressure as additional folds are made to shape the blank into the pouch, in closed position. A weight such as a brick is then placed on the closed pouch for an extended period of time to hold the shape as the pouch dries. A flat, relatively stiff centerpiece is glued to the interior of the pouch after drying, or at an earlier point in the process.

The labor-intensive nature of the process described above renders it undesirably expensive, and makes quality control problematic as well. Where errors are made with respect to placement of fold lines during manufacture, the pouch may not open properly. Even small errors can produce this result. Errors of small magnitude in placement of fold lines may also render the pouch unacceptable for retail sale based on aesthetic considerations. The pouch depends upon precise symmetry for aesthetic appeal, and irregularities are readily discernible to the eye of the consumer.

Accordingly, it is a general object of the invention to provide an improved method of manufacturing leather pouches which is more economical and offers improved consistency and quality control. Further objects of the invention will become apparent from the description set forth below and from the accompanying illustrations.

SUMMARY OF THE INVENTION

In accordance with the present invention, there is provided a method and apparatus for manufacturing leather coin pouches wherein a preforming die is employed to shape the blank into a generally frusto-conical shape as an intermediate step between initial creasing and final shaping so that the folds required to give the pouch its desired shape are consistently formed with precision and accuracy, without requiring painstaking manual labor. The method preferably involves cutting a substantially flat leather cover of a particular shape, cutting a substantially flat centerpiece of a particular smaller shape from a less flexible material and laminating the centerpiece to the leather cover, near the center of the cover. The preferred method further comprises wetting the resulting leather assembly to soften the leather, by passing the leather assembly between a pair of wetting rollers. Thereafter, the leather is creased on both sides to begin formation of the fold lines. After the preforming process is carried out as described above, a masonite center is placed on the centerpiece to provide depth for the pouch, and the leather assembly is manually folded into a closed position with a simple, quick twisting motion. The leather assembly is then formed in its closed position and subsequently dried in an oven while under pressure.

BRIEF DESCRIPTION OF THE DRAWINGS

FIG. 4 is a sectional view taken substantially along the line 4—4 in FIG. 3;

FIG. 9 is a perspective view of a forming die in accordance with a preferred embodiment of the invention;

DETAILED DESCRIPTION OF THE PREFERRED EMBODIMENT

Figure 1:
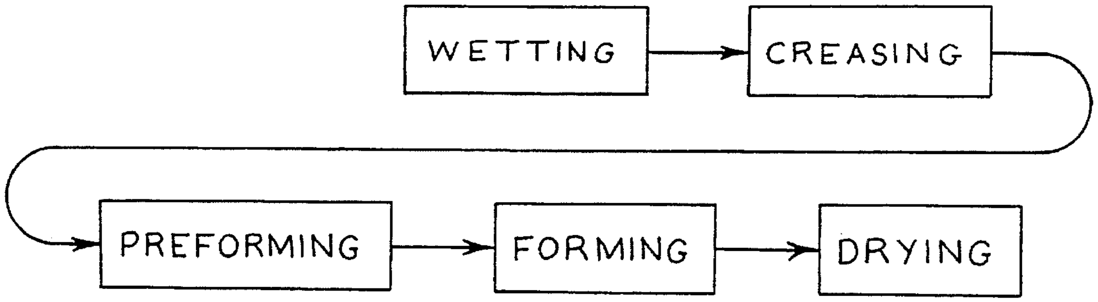
FIG. 1 is a schematic diagram of a method in accordance with a preferred embodiment of the invention.

The invention is generally embodied in a method and apparatus for manufacturing leather coin pouches.

In a preferred embodiment of the invention, a flat, flexible leather cover 11 (FIG. 5) is cut into a symmetrical, generally epicycloid or flower-like shape having a plurality of cusps 90 defined by a perimeter of rounded petals 96. Each petal 96 has a center 99, the center being a uniform distance from each point on the edge of the petal 96, including the apex 98 of the petal, the outermost point of the leather assembly, the apex 98 being collinear with its corresponding petal center 99 and the leather assembly center 92.

A flat leather centerpiece 38 of stiffer material is cut into a smaller shape and is then laminated to the leather cover 11 with a suitable adhesive so that the centers 92 of the leather assembly 36 and the centerpiece 38 substantially coincide, creating a leather assembly 36.

Figure 5:
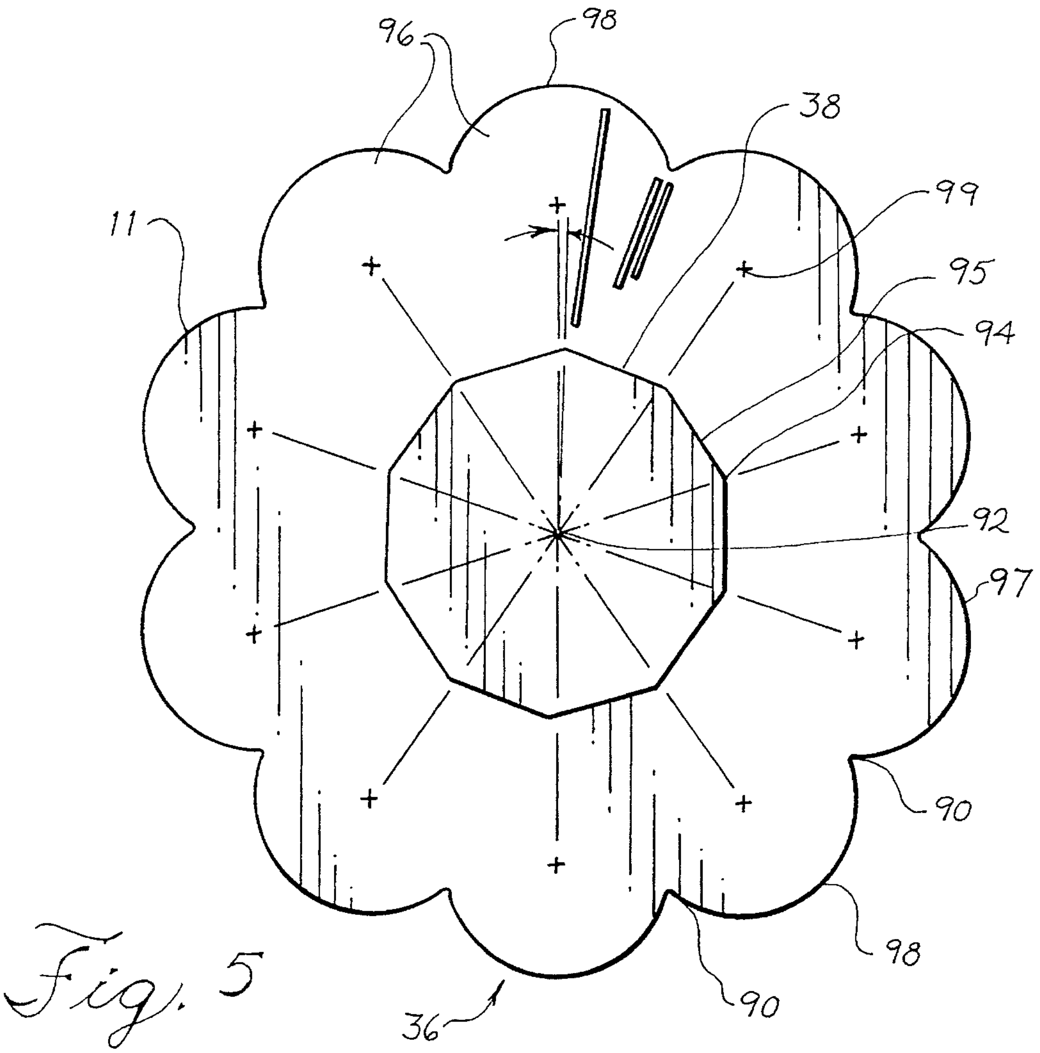
FIG. 5 is a top plan view of a leather assembly with creasing rod placement during creasing in accordance with a preferred embodiment of the invention.

In the preferred embodiment, the centerpiece 38 is substantially a regular polygon having the same number of sides 95 and corners 94 as the cover 11 has cusps 90. In the preferred embodiment, the leather cover 11 has ten cusps, with one side of the decagonal centerpiece corresponding to each cusp of the cover. Thus, the petal centers 99 are angularly offset from adjacent petal centers 99 by 36°. The corners 94 of the centerpiece 38 and the apexes 98 of the petals 96 of the leather cover 11 may be radially aligned from the center 92 of the leather assembly 36, but in the preferred embodiment, there is about a 2° angular offset in radial alignment, as seen in FIG. 5.

Figure 2:
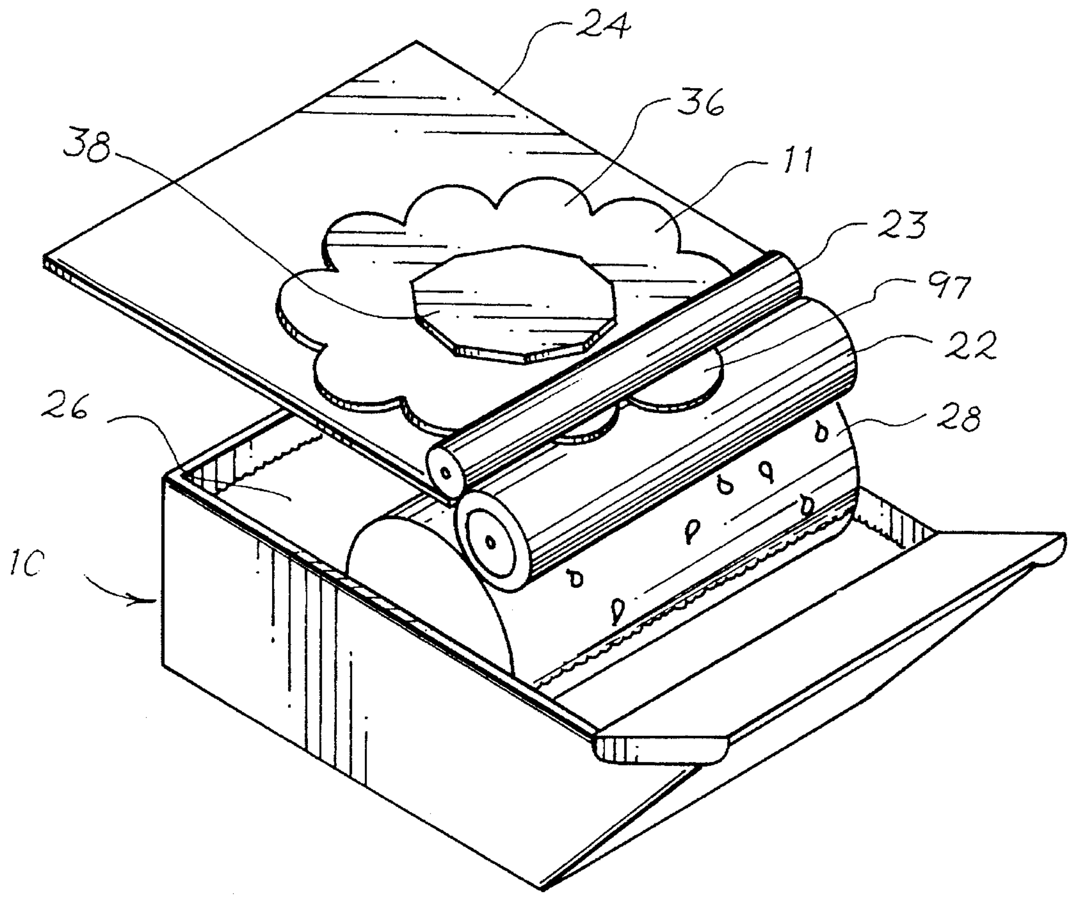
FIG. 2 is a perspective view of a wetting apparatus in accordance with a preferred embodiment of the invention.

The leather assembly 36 is then run through a wetting apparatus 10 (FIG. 2). In the preferred embodiment, the wetting apparatus comprises a plurality of rollers having absorbent surfaces for applying water to the assembly 36. The illustrated wetting apparatus 10 comprises a Schaefer laminating machine that has been equipped with specially coated rollers for applying water. While laminating machines of this type generally have been used for applying adhesives, their rollers are not suitable for application of water unless modified as described herein. The water 26 serves to soften the leather assembly 36 facilitating subsequent steps in the forming process.

The Schaefer machine comprises three or more substantially parallel cylindrical rollers which are rotated continuously by a suitable drive and are in longitudinal frictional contact so that rotation of one roller about its axis causes rotation of each other roller about its axis. The largest roller is the water roller 28. The water roller 28 is partially submerged in the water 26, and, through surface contact, transfers water to the large wetting roller 22. The larger wetting roller 22, in turn, transfers water to one or more small wetting rollers 23 through surface contact.

In a preferred embodiment of the invention, the large wetting roller 22 is rotationally driven about its axis, rotating the other rollers 23, 28 through frictional contact. The rollers have an appropriate outer layer, such as a foam material, to retain water. To wet the leather assembly 36, the operator or a machine places an edge 97 of the leather assembly 36 between the two wetting rollers 22, 23, and the leather assembly 36 is pulled off a flat board 24, through the two rollers, having water 26 applied to both its surfaces. This may be repeated as necessary to attain sufficient wetness. In the illustrated embodiment, only a single wetting roller 23 is shown. In another preferred embodiment, there are two small wetting rollers 23 rotating in concert with the large wetting roller 22 while the leather assembly 36 passes between each small wetting roller 23 and the large wetting roller 22.

Figure 3:
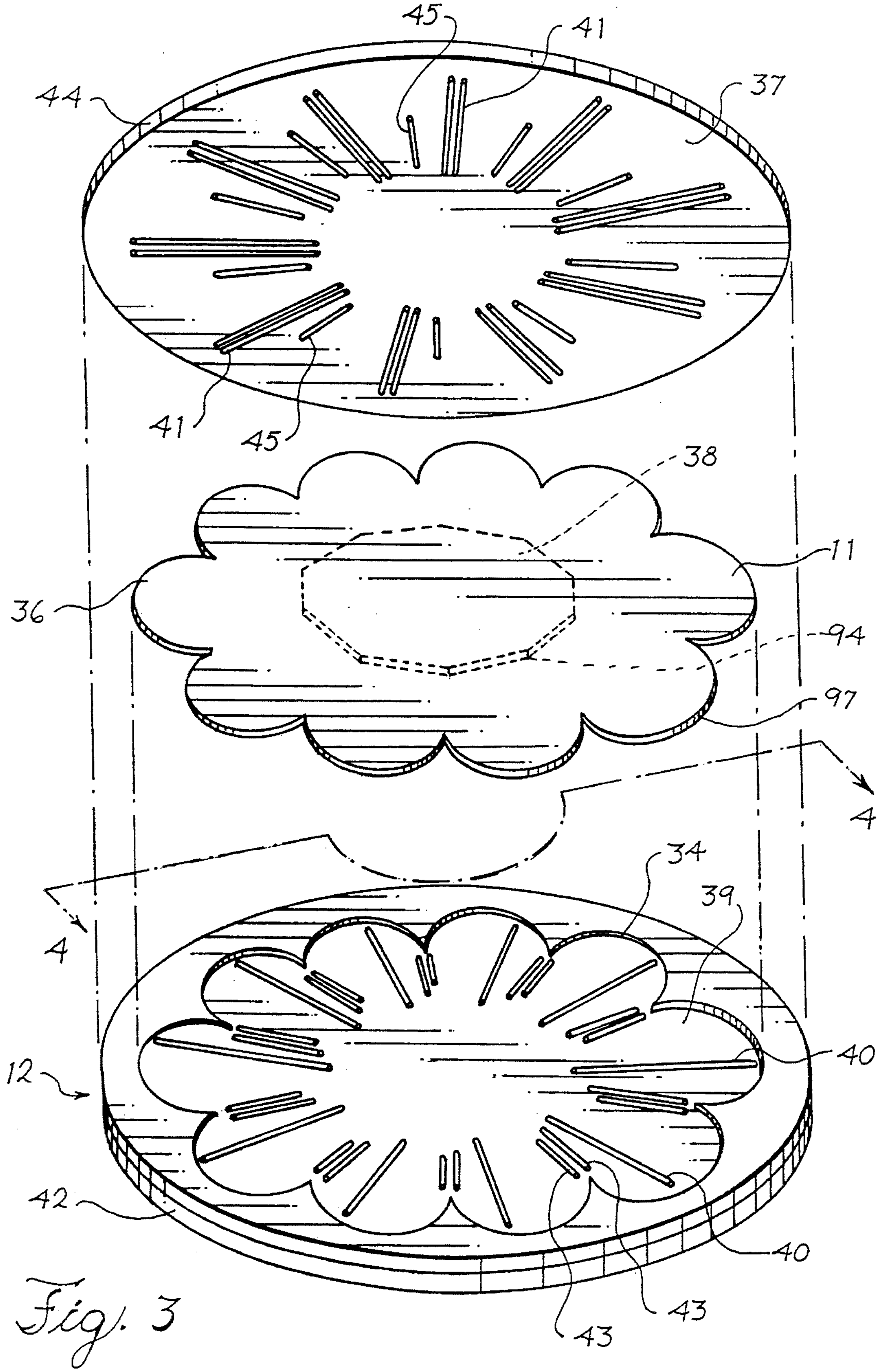
FIG. 3 is an exploded perspective view of a creasing die in accordance with a preferred embodiment of the invention.

Once wet, the leather assembly 36 is creased by the creasing apparatus. In the preferred embodiment of the invention, the creasing apparatus comprises a male-female creasing die 12 (FIGS. 3 and 4) comprising a heated top creasing plate 44 and a heated bottom creasing plate 42. The leather assembly 36 is placed in an inverted orientation with the centerpiece 38 downwardly oriented and the finished side up, as shown in FIG. 3, within a recessed leather assembly compartment 34 of the bottom creasing plate 42 of the creasing die 12.

The top creasing plate 44 has adjacently paired long creasing rods 41 and single short creasing rods 45 on its inner surface 37. The bottom creasing plate 42 has single long creasing rods 40 and adjacently paired short creasing rods 43 along its inner surface 39. When the top creasing plate 44 is pressed upon the bottom creasing plate 42, each of the single long creasing rods 40 on the bottom plate 42 pinches the leather cover 11 between a correspondingly aligned pair of long creasing rods 41 on the top plate 44, causing a downwardly opening crease in the leather cover 11. At the same time, each of the single short creasing rods 45 on the top plate pinches the leather cover 11 between a correspondingly aligned pair of short creasing rods 43 on the bottom plate, causing an upwardly opening crease in the leather cover 11. The dwell time is preferably about three seconds. The creasing of the leather assembly 36 facilitates the subsequent preforming step and, eventually, folding the cover 11 along those crease lines.

Figure 6:
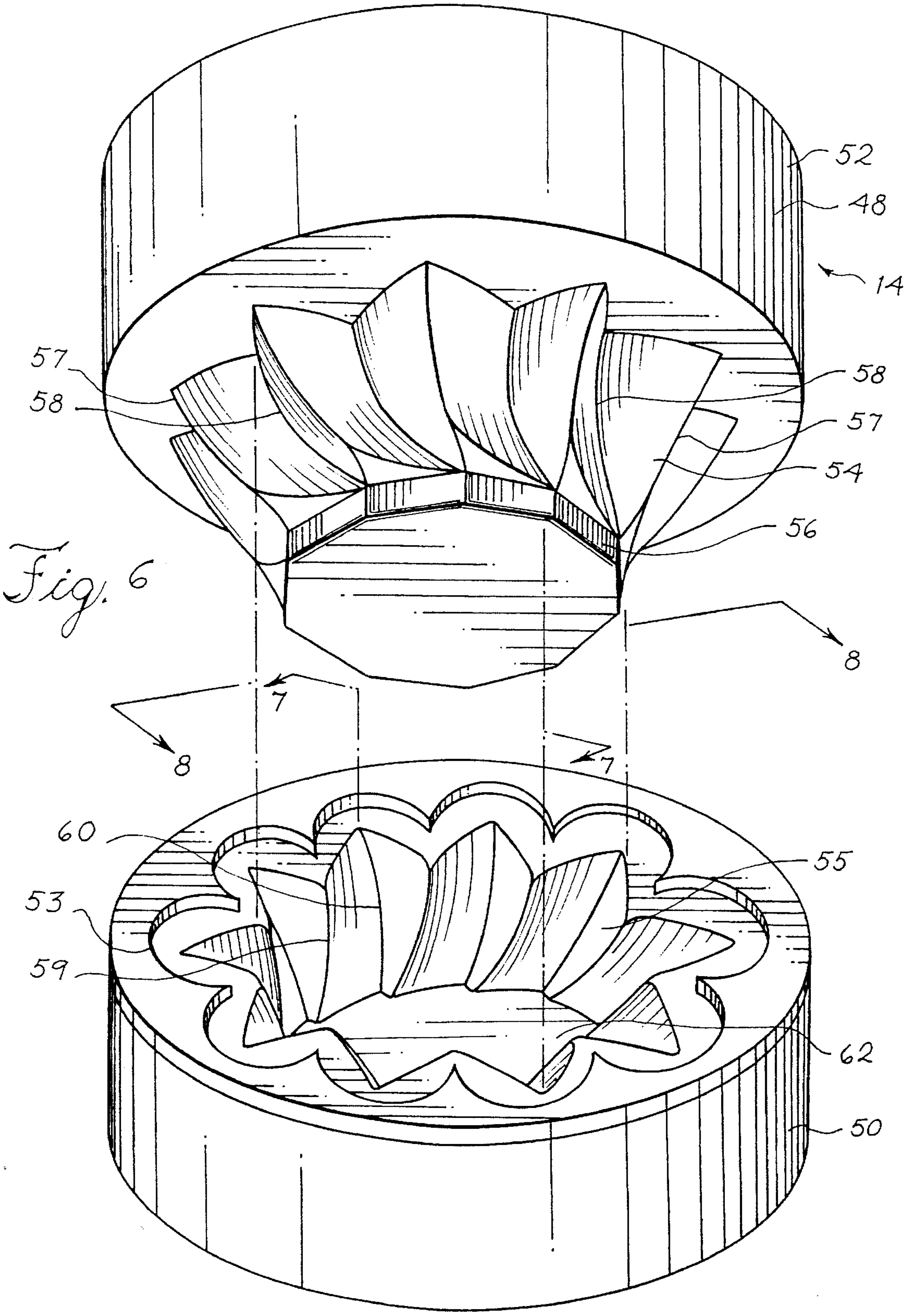
FIG. 6 is a perspective view of a preforming die in accordance with a preferred embodiment of the invention.
Figure 7:
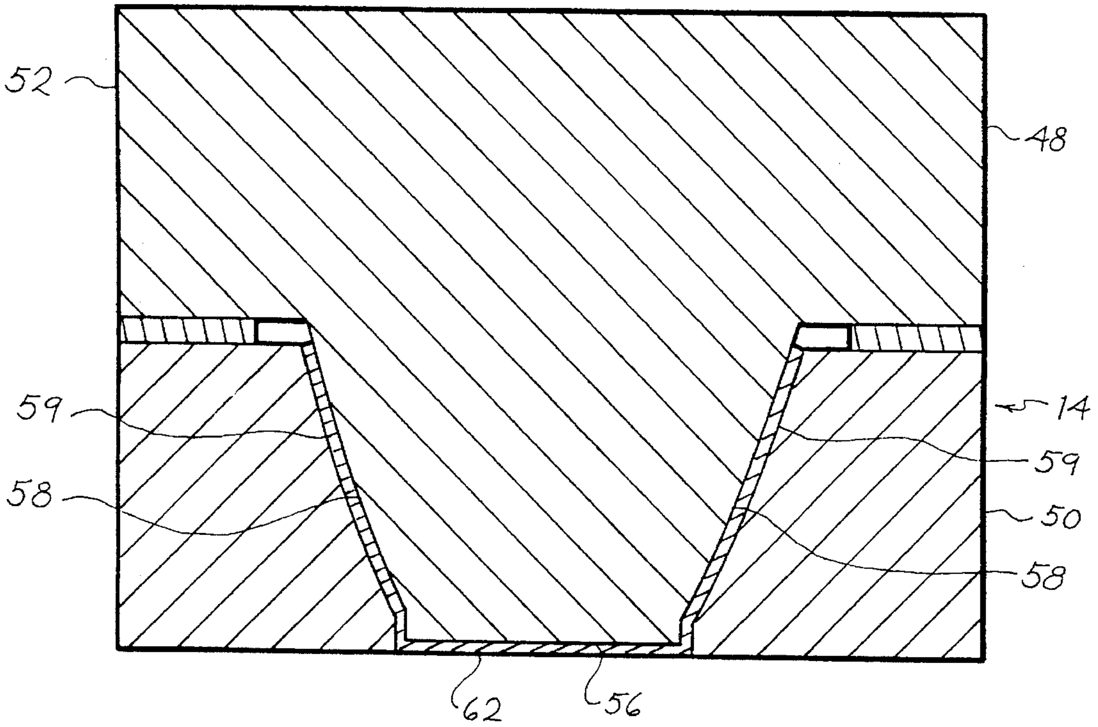
FIG. 7 is a sectional view taken substantially along the line 7—7 in FIG. 6.
Figure 8:
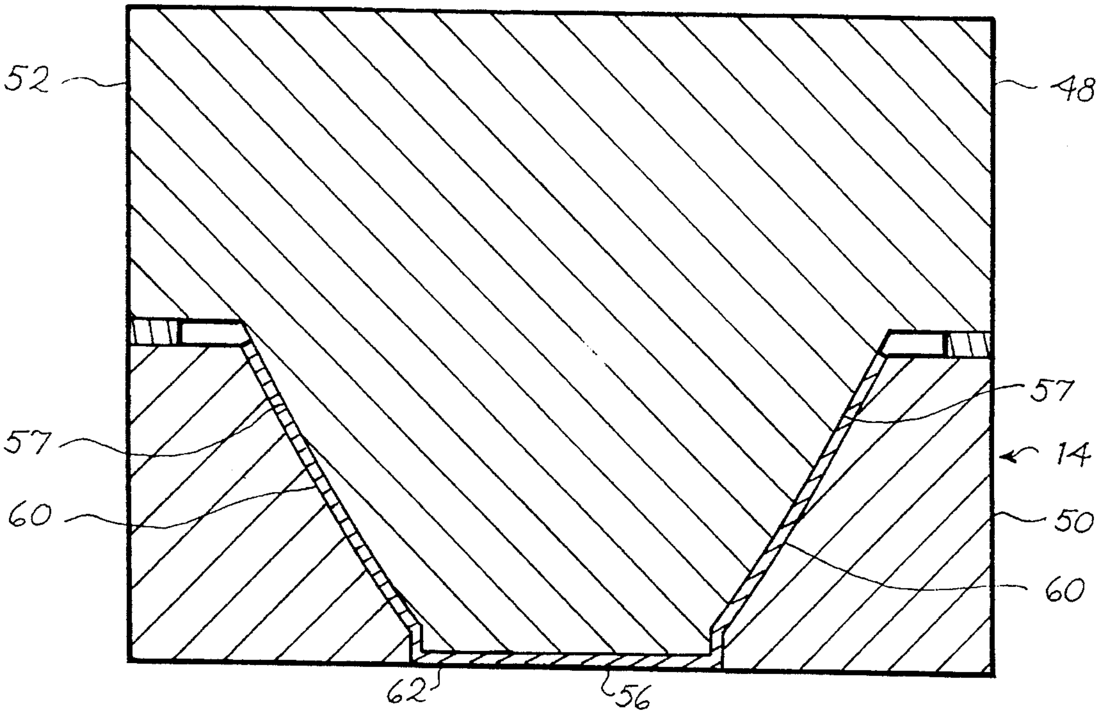
FIG. 8 is a sectional view taken substantially along the line 8—8 in FIG. 6.
Figure 10:
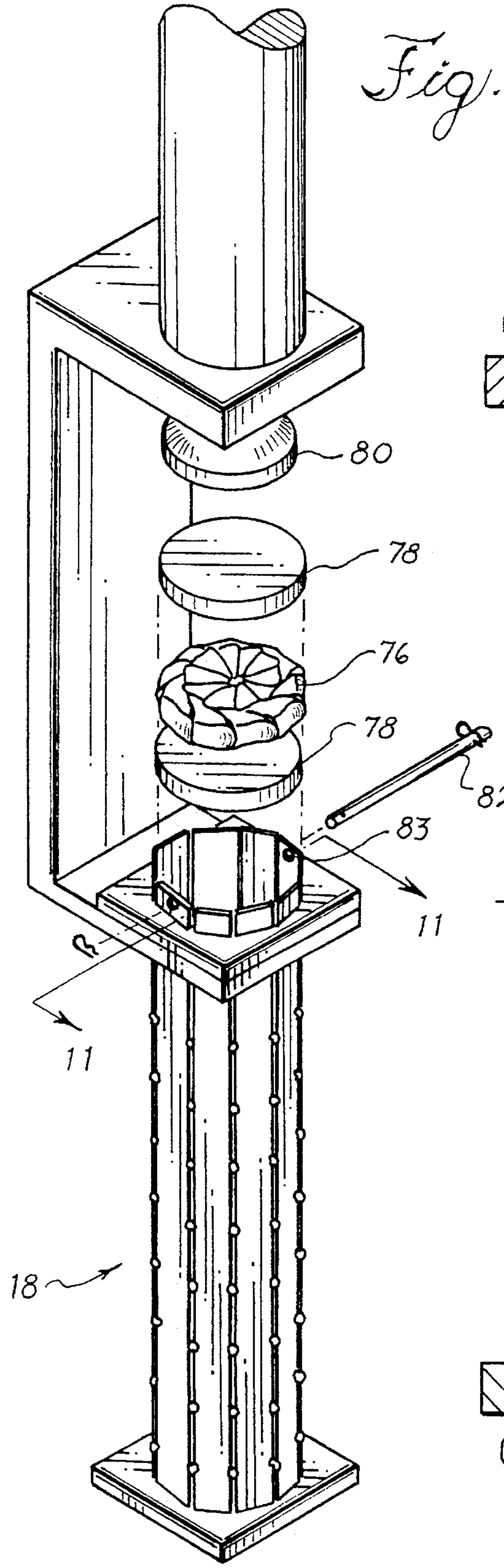
FIG. 10 is an exploded perspective view of a drying tube in accordance with a preferred embodiment of the invention.
Figure 11:
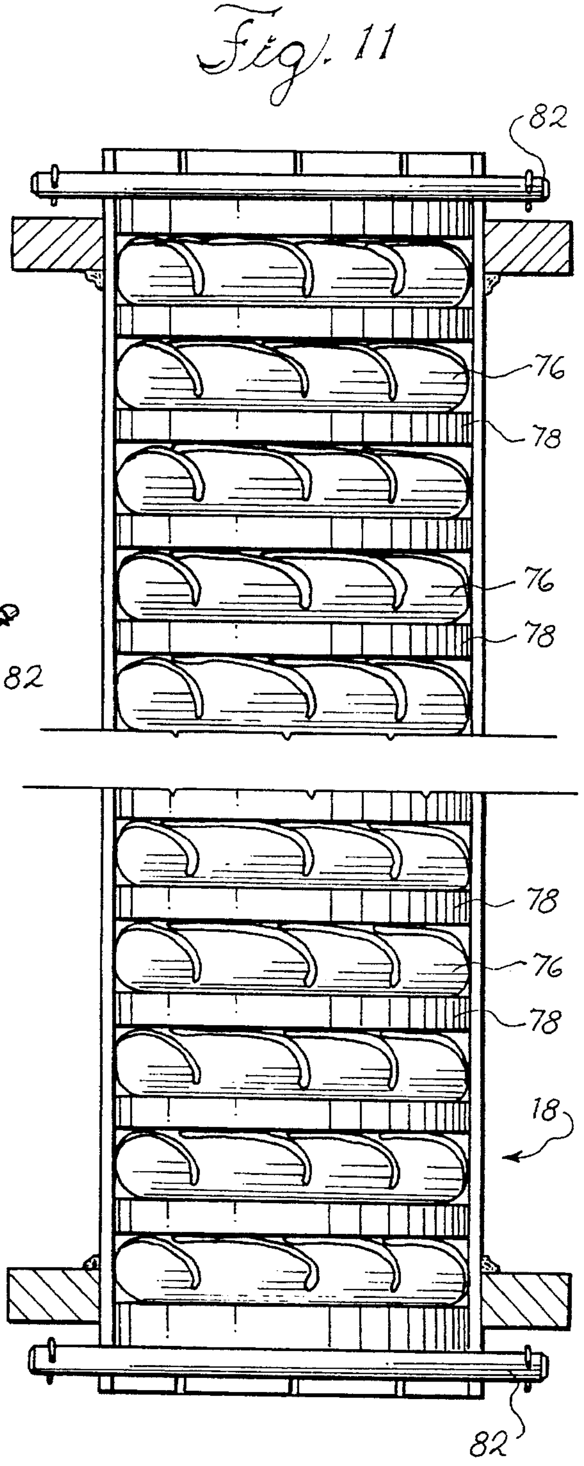
FIG. 11 is a sectional view taken substantially along the line 11—11 in FIG. 10.

The next step in the method is preforming. In the preferred embodiment, a generally frusto-conical preforming die 14, as shown in FIG. 6, is used. The top preforming component 48 of the die 14 comprises a base 52, a centerpiece top plate 56, and a male ridge/groove surface 54 between them. The male ridge/groove surface has alternating ridges 57 and grooves 58. Its general shape is that of a pyramidic solid with a base shaped substantially like a ten-pointed star and a vertex truncated by a decagon-shaped surface parallel to the base. Along the height of the pyramidic solid there is a small, gradual angular twisting of the ten-pointed cross-section, facilitating the spiraling closure of the assembly.

The top plate 56 is substantially of the same shape as the centerpiece 38, decagonal in the preferred embodiment. The base 52 of the top preforming member 48 is generally circular and of similar diameter as the bottom preforming component 50.

The bottom preforming component 50 of the die 14 has a recessed leather assembly compartment 53 for insertion of the leather assembly 36, and below the recessed compartment 53 is a generally frusto-conical concavity having a female ridge/groove surface 55. The female ridge/groove surface 55 comprises alternating ridges 59 and grooves 60 configured in substantial complement to the male ridge/groove surface 54. At the bottom of the generally frusto-conical concavity is a centerpiece bottom plate 62.

The creased, but still substantially flat, leather assembly is inserted into the appropriately shaped recessed compartment 53 of the bottom preforming component 50. The two components of the die 14, the top preforming component 48 and the bottom preforming component 50, are then forced together until the centerpiece top plate 56, at the bottom of the top preforming component 48, presses the laminated centerpiece 38 and the back of the creased leather assembly against the centerpiece bottom plate 62 within the bottom preforming component 50. As this occurs, the leather cover 11 of the creased leather assembly is preformed between the protruded male ridge surface 54 of the top preforming component 48 and the complementary concave female ridge surface 55 of the bottom preforming component 50. As the two components 48 and 50 are pressed together, the curvature of the ridged surfaces 54 and 55 produces fold lines disposed to facilitate the desired spiral closure. The preforming gives the leather cover 11 a flat-bowled shape with folded sides.

In the decagonal embodiment, embedding upwardly-opening creases extending from near each corner 94 of the decagonal centerpiece 38 to a point near the edge 97 of the leather cover 11 and embedding downwardly-opening creases extending from near the same corner 94 of the decagonal centerpiece 38 to an adjacent cusp 90 serves to facilitate the desired spirally folding decagonal shape.

The preformed leather assembly is then formed by a forming apparatus, as shown in FIG. 9. In the preferred embodiment, the forming apparatus comprises a forming die 16 that has a recessed compartment 66 and a hinged lid 68. A masonite slab or slab of similar material is inserted into the preformed leather assembly to provide depth to the pouch during forming. With the masonite slab inserted, the folded sides of the preformed leather assembly are manually twisted to spirally close the pouch, placing the preformed leather assembly in the desired final shape. The twistedly closed preformed leather assembly is then inserted into the recessed compartment 66 which corresponds to the shape of the pouch. In the preferred embodiment, the recessed compartment 66 is decagonal so the decagonal preformed leather assembly fits tightly inside. While the closed preformed leather assembly is held in place in the recessed compartment 66, the forming die lid 68 is lowered upon a forming die hinge 67 until it meets the top surface 72 of the forming die bottom 74. The pressure sets the preformed leather assembly in the spirally closed shape resulting from the manual twisting as shown in FIG. 9.

Finally, the resulting formed leather assembly is dried. In the preferred embodiment, the formed leather assembly is inserted into a drying tube 18 with several other formed leather assemblies. Each formed leather assembly is inserted contemporaneously with a substantially circular separation plate 78 for separating the formed leather assemblies. The formed leather assemblies and plates 78 fit sufficiently tightly into the tube 18 to frictionally maintain their position at the top of the tube 18 until a pneumatically operated plunger head 80 pushes them downwardly into contact with the previously inserted assembly-slab pair. In the preferred embodiment, the drying tube 18 is decagonal in cross-section, facilitating maintenance of the formed shape of the formed leather assembly during drying. The plunger head 80 is generally circular in cross-section, of diameter slightly less than that of the substantially circular separation plates 78. When a drying tube 18 is full, the operator may slide a pin 82 through a pin hole 83 in the top of the drying tube 18 before placing the tube 18 in an oven for drying. In the preferred embodiment, the oven maintains approximately 300° F. and the formed leather assemblies require about 2½ hours to dry.

What is claimed is:

1. An apparatus for manufacturing a coin pouch from a leather assembly comprising a substantially flat, flexible leather cover laminated to a substantially flat, more rigid centerpiece, said apparatus comprising:

a wetter for wetting said leather assembly;

a creasing die for creasing said leather assembly into a creased leather assembly;

a preforming die for preforming said creased leather assembly, said die comprising generally frusto-conical male and female members which are pressed together to bring said creased leather assembly into a configuration facilitating manual manipulation of said leather assembly into a spirally closing pouch;

a forming die for forming said creased leather assembly into a foldedly raised formed leather assembly with spiral closure; and an oven for drying said formed leather assembly.

2. An apparatus in accordance with claim 1 wherein said wetter is a machine having foam-coated wetting rollers, said machine being capable of wetting said leather assembly by pulling said leather assembly between said foam-coated wetting rollers.

3. An apparatus in accordance with claim 1 wherein said creasing die forms both upwardly-opening creases and downwardly-opening creases in said leather assembly.

4. An apparatus in accordance with claim 1 further comprising a drying tube which maintains said formed leather assembly in its desired shape while said formed leather assembly is dried in said oven.

5. A method for manufacturing a coin pouch from a leather assembly comprising a substantially flat, flexible leather cover laminated to a substantially flat, more rigid centerpiece, said method comprising the following steps:

wetting said leather assembly;

creasing said leather assembly into a creased leather assembly;

preforming said creased leather assembly wherein said preforming is accomplished by a generally frusto-conical preforming die having male and female members which are pressed together to bring said creased leather assembly into a configuration facilitating manual manipulation of said leather assembly into a spirally closing pouch;

forming said creased leather assembly into a foldedly raised formed leather assembly with spiral closure; and drying said formed leather assembly.

6. A method in accordance with claim 5 wherein said wetting is accomplished by a wetting machine having foam-coated wetting rollers, said machine being capable of wetting said leather assembly by pulling said leather assembly between said foam-coated wetting rollers.

7. A method in accordance with claim 5 wherein said creasing forms both upwardly-opening creases and downwardly-opening creases in said leather assembly.

8. A method in accordance with claim 5 wherein said drying is accomplished by an oven.

9. A method in accordance with claim 8 wherein said drying is accomplished by placing said formed leather assembly into a drying tube which maintains said leather assembly in its desired shape during the drying process.

10. An apparatus for manufacturing a coin pouch from a leather assembly comprising a substantially flat, flexible leather cover laminated to a substantially flat, more rigid centerpiece, said apparatus comprising:

means for wetting said leather assembly;

means for creasing said leather assembly into a creased leather assembly;

means for preforming said creased leather assembly wherein said means for preforming is a generally frusto-conical preforming die having male and female members which are pressed together to bring said creased leather assembly into a configuration facilitating manual manipulation of said leather assembly into a spirally closing pouch;

means for forming said creased leather assembly into a foldedly raised formed leather assembly with spiral closure; and means for drying said formed leather assembly.

* * * * *